Feb. 12, 1929.
L. H. CHESSON
1,701,971
LARDAMETER
Filed July 30, 1924    4 Sheets-Sheet 3
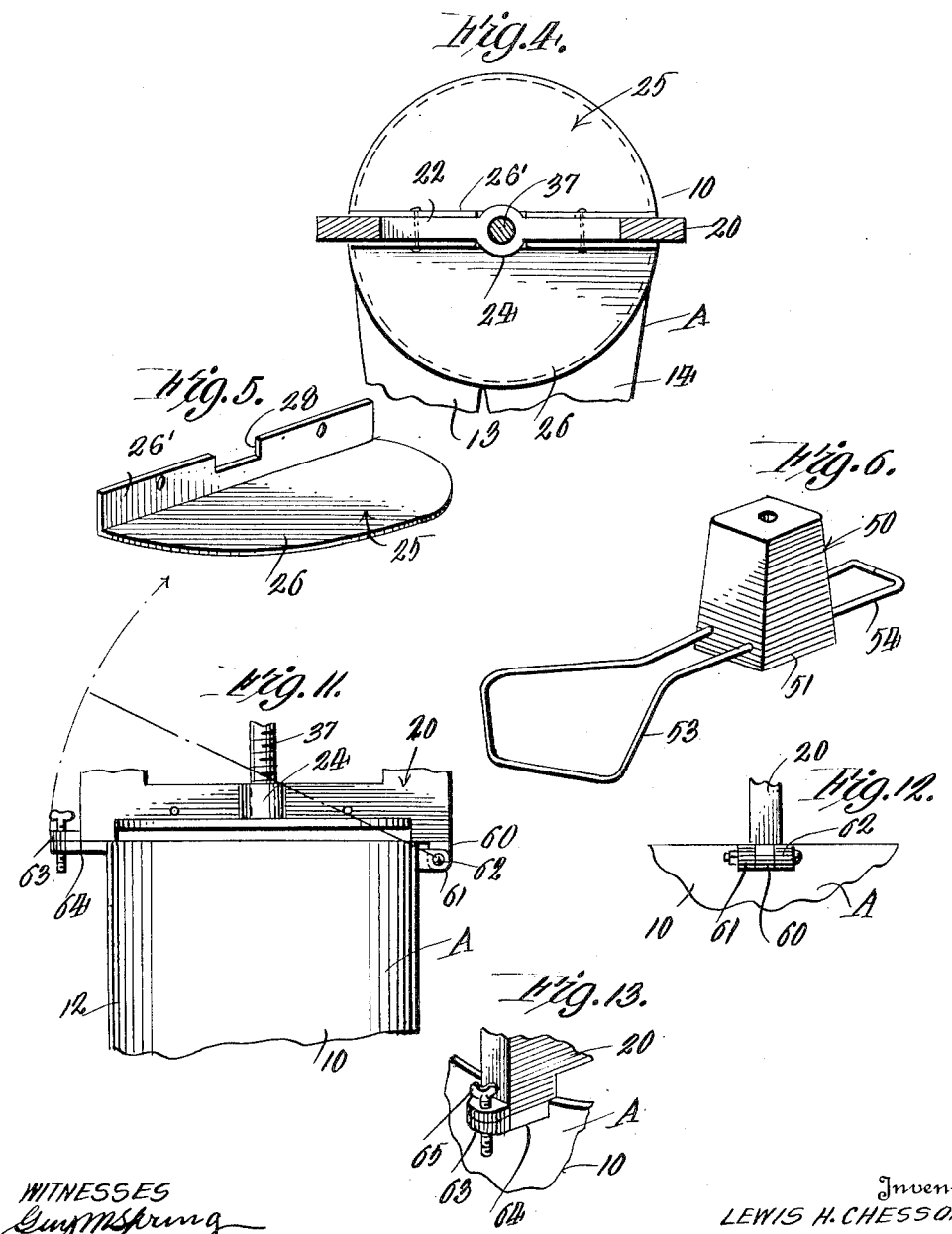

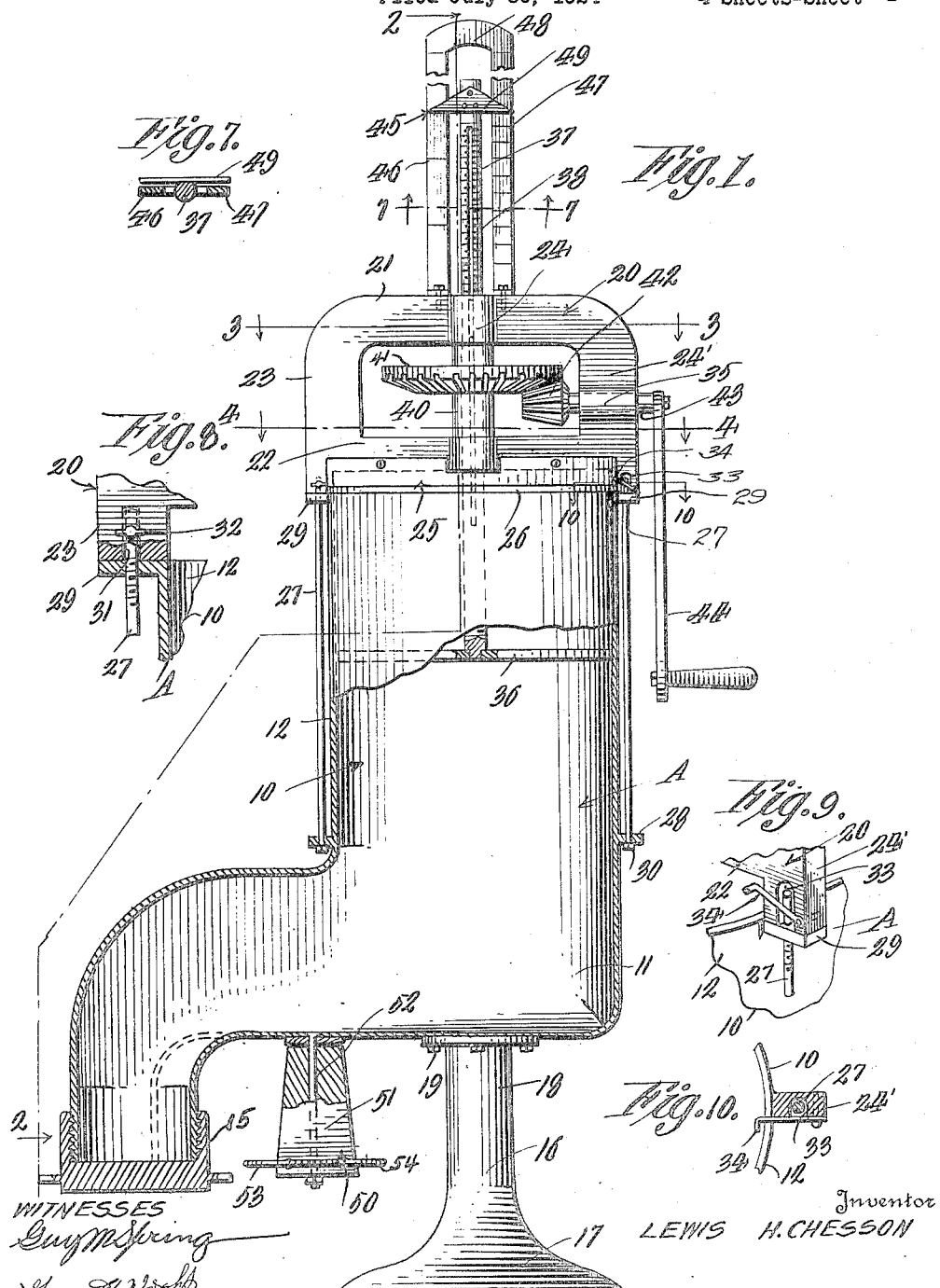

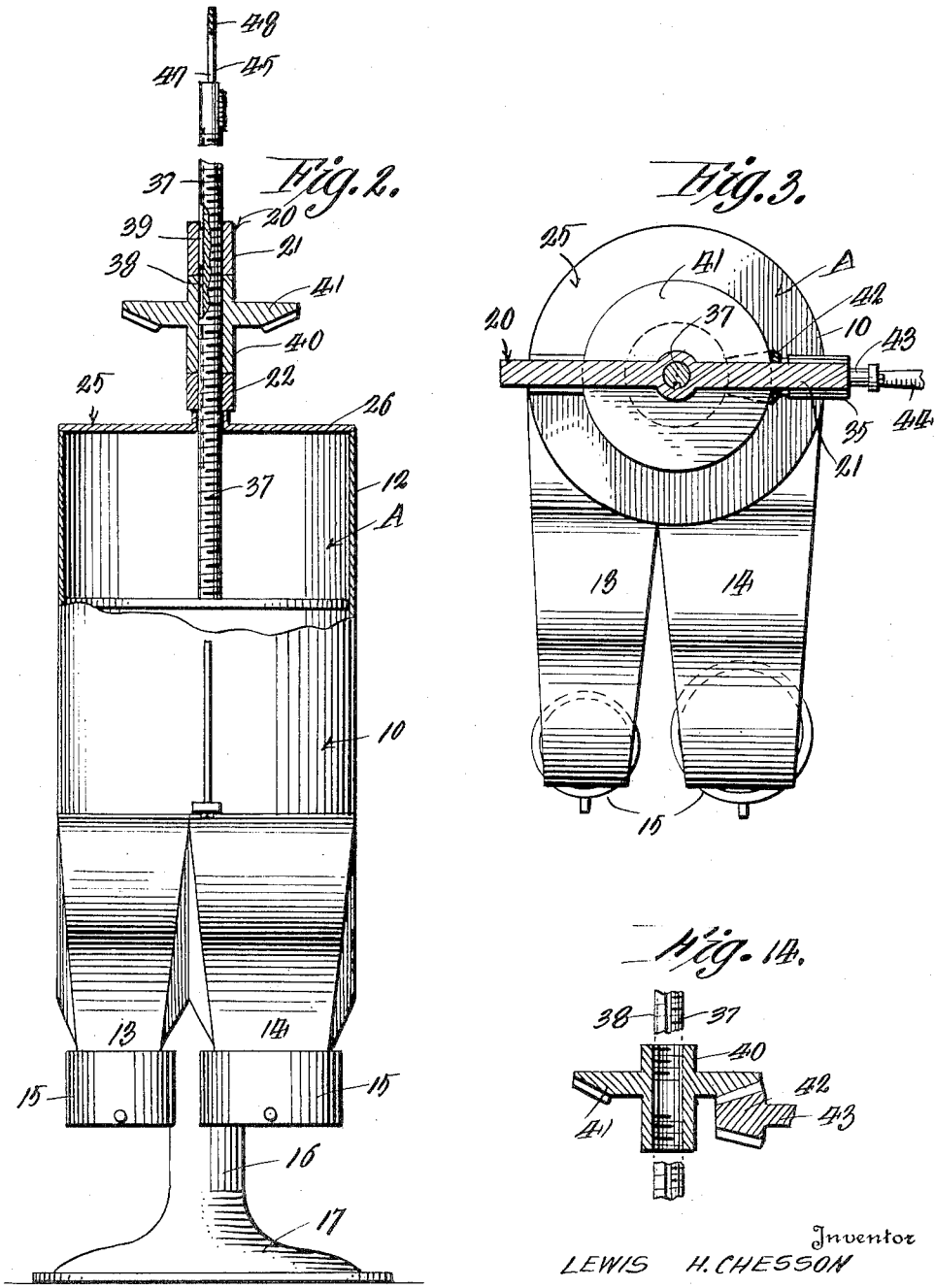

Feb. 12, 1929.
L. H. CHESSON
LARDAMETER
Filed July 30, 1924
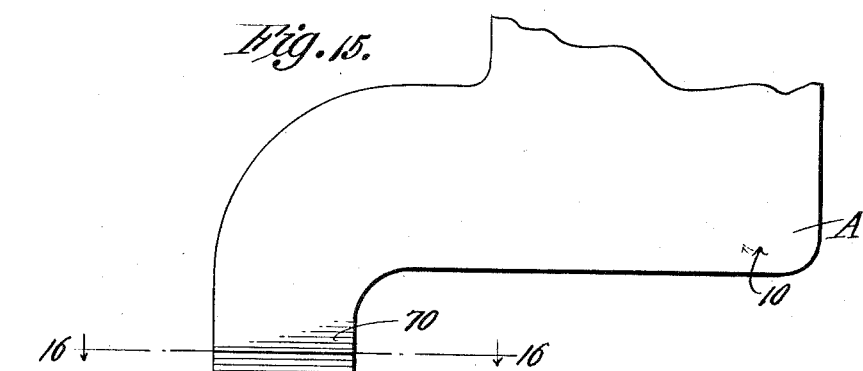
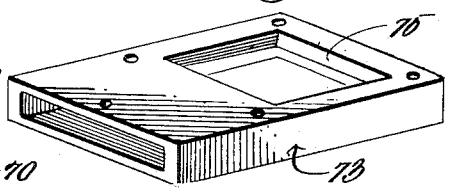
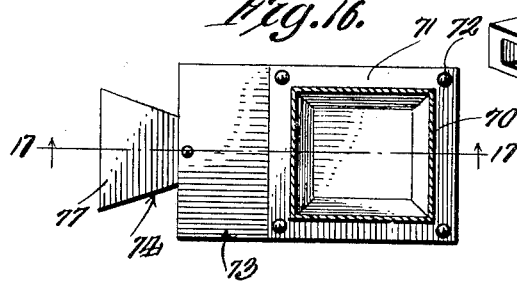
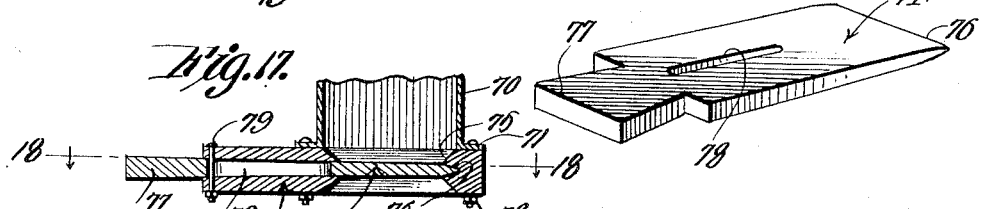
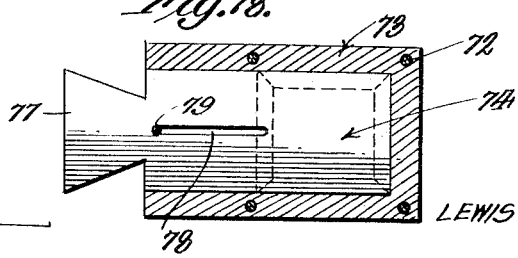
Inventor
LEWIS H. CHESSON Patented Feb. 12, 1929.

1,701,971

UNITED STATES PATENT OFFICE.

LEWIS H. CHESSON, OF HENDERSON, NORTH CAROLINA.

LARDAMETER.

Application filed July 30, 1924. Serial No. 729,196.

This invention appertains to store apparatus, and the primary object of the present invention is to provide a novel machine for dispensing semi-solid foodstuffs such as lard, sausage meat, and the like.

The primary object of the present invention is to provide a novel dispensing machine in which the foodstuffs can be kept in a clean and sanitary condition and dispensed to customers in a convenient and expeditious manner.

A further object of the invention is to provide a dispensing machine embodying a container of ample proportions for receiving the foodstuffs to be dispensed and novel means for forcing the material from the container.

A further object of the invention is to provide novel delivery spouts of different sizes connected with the container for permitting different amounts of material to be readily placed in suitable dispensing receptacles provided for that purpose.

A further object of the invention is to provide a novel cutting member disposed between the spouts for effectively severing the material dispensed from the spouts from the main body of the material contained in the container and said spouts.

A further object of the invention is to provide a novel means for connecting the means for forcing the material from the container with the upper end thereof, whereby said means can be swung to an inoperative position out of vertical alignment with the container to permit material to be readily placed in the container for dispensing purposes.

A still further object of the invention is to provide an improved device of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated in the accompanying drawings, in which drawings:—

Figure 1 is a side elevation of the improved dispensing machine showing parts thereof broken away and in section, Figure 2 is a front elevation of the machine looking in the direction of the arrows on the line 2—2 of Figure 1, showing parts thereof broken away and other parts in section, the dispensing spouts being shown in front elevation.

Figure 3 is a horizontal section taken through the improved machine on the line 3—3 of Figure 1 looking in the direction of the arrows.

Figure 4 is a horizontal section through the improved machine taken on the line 4—4 of Figure 1 looking in the direction of the arrows, Figure 5 is a detailed perspective view of one of the sections of the cover carried by the supporting arch, Figure 6 is a detailed perspective view of the novel cutter utilized for severing the material dispensed from said spout, Figure 7 is a detailed horizontal sectional view through the indicator and feed screw taken on the line 7—7 of Figure 1 looking in the direction of the arrows, Figure 8 is an enlarged fragmentary vertical sectional view illustrating the means of hingedly connecting the supporting arch with the container, Figure 9 is a fragmentary detailed perspective view illustrating the means for locking the supporting arch in place over the container in operative position, Figure 10 is a detailed horizontal section taken on the line 10—10 of Figure 1 looking in the direction of the arrows, and illustrating the means for holding the arch in operative position against accidental displacement, Figure 11 is a fragmentary side elevation of the machine showing a slightly modified form of means for hingedly connecting the supporting arch on the container, Figure 12 is a fragmentary rear elevation illustrating the modified form of means for connecting the supporting arch in place, Figure 13 is a fragmentary detailed perspective view illustrating the locking means for holding the arch in operative position against accidental displacement in said modified form, Figure 14 is a detailed vertical section showing the novel means for operating the feed screw or plunger, Figure 15 is a fragmentary side elevation of the machine showing a modified form of dispensing spout and cutoff, Figure 16 is a horizontal section through the spout taken on the line 16—16 of Figure 15 looking in the direction of the arrows, Figure 17 is a fragmentary vertical section through the modified form of spout and cutoff taken on the line 17—17 of Figure 16 looking in the direction of the arrows, Figure 18 is a horizontal section taken on the line 18—18 of Figure 17 looking in the direction of the arrows and illustrating the construction of the modified form of cutoff and the means of mounting the same within the supporting frame therefor, Figure 19 is a detail perspective view of the supporting frame, Figure 20 is a detail perspective view of the improved cutoff and cutting block.

Referring to the drawings in detail, wherein similar reference characters designate corresponding parts throughout the several views, the letter A generally indicates the improved dispensing apparatus, which comprises a container 10 including a chamber 11, and the upstanding cylindrical body 12. The lower end of the chamber 11 has formed thereon the arcuate dispensing spouts 13 and 14. It is preferred to mold the container 10 and the spouts 13 and 14 from cast iron, but it is obvious that the container and spouts can be made in any other desired way. As shown the spouts 13 and 14 communicate with the lower end of the chamber 11 at one side thereof and these spouts are of different sizes as can be readily seen by referring to Figure 2 of the drawings. The small spout 13 is utilized for dispensing foodstuffs from one-quarter of a pound to five pounds, while the larger spout 14 is utilized for dispensing foodstuffs in quantities greater than five pounds. It is of course understood that suitable receptacles of different sizes are to be placed under the spouts 13 and 14 when the foodstuff is being dispensed therefrom. The spouts can be normally closed by caps 15 which can be threaded thereon. It thus can be seen that the material contained in the machine will be kept in a clean and sanitary condition at all times. The container 10 can be supported by a cast iron pedestal 16 if so desired, and as shown this pedestal 16 is provided with a flared lower base 17 in order to provide an enlarged bearing surface for engaging the floor or counter upon which the machine is placed. If so desired the flared base 17 can be held on the floor or counter by the use of suitable screws, bolts, or the like. The upper end of the pedestal 17 is provided with an annular flange 18 to permit the same to be readily connected to the lower wall of the container 10 by the use of suitable machine screws 19 or the like. While I have shown a pedestal 16 supporting the container it is to be understood that other supporting means can be used, such as legs and the like.

The upper open end of the container 10 has normally extending diametrically across the same an arch or vertically disposed head block 20 which includes upper and lower parallel side bars 21 and 22 and connecting vertically disposed end bars 23 and 24'. This arch or head block can also be made of cast iron if so desired. The upper and lower bars 21 and 22 of the arch or head block 20 are provided with vertically aligned bearing sleeves 24 which are disposed at the axial center of the container when the arch is in its operative position over the top of the said container. The lower bar 22 of the arch 20 supports the cover 25 which includes a pair of companion semi-circular plates 26 the inner edges of which are provided with attaching flanges 26' which are bolted or otherwise attached to said lower bar 22. As shown, the central portions of the attaching flanges 26' are provided with cut out portions 28 for receiving the lower bearing sleeve of the arch. By this construction it can be seen that when the arch is in normal operative position the upper end of the container is completely closed, which effectively prevents the entrance of dust and other foreign matter into the said container. This arch is held in place in a novel manner so as to permit the same to be swung to one side of the container in order to permit the container to be initially filled with the material which is to be dispensed. This means includes vertical side rods 27 which are disposed on opposite sides of the container. These rods extend through lower lugs 28 cast on the body 12 and are threaded into upper lugs 29 formed on the upper end of the said body. The lower ends of the rods 27 are provided with polygonal heads 30 which engage the lower lugs 28 and it is obvious that the rods can be readily threaded into place by said heads. If necessary the head 30 on the rod which falls above the spouts can be placed on the rod after the rod has been placed in position. These rods extend above the upper lugs 29 and one rod extends into a suitable bearing opening 31 formed in the lower end of the side bar 23 of the head or arch 20. If so desired a thumb screw 32 can be provided for engaging the said rod. The lower terminals of the side bars 23 and 24' are adapted to fit upon the lugs 29 and the arch swung on the upper end of the rod 27, which is arranged above the spouts as clearly shown in the drawings. The side bar 24' is provided with a notch 33 for receiving the upper end of the other rod 27. When the arch or head 20 is swung over the container to its operative position accidental turning movement thereof on the container is prevented by means of a pivoted latch 34 which is carried by one end of the side bar 24'. This latch 34 is adapted to be swung across the notch 33 and into the path of the upper end of the adjacent rod 27, which locks the rod in the notch and consequently prevents movement of the arch in a horizontal plane. The side bar 24' is provided with a horizontally disposed bearing sleeve 35, the purpose of which will be hereinafter more fully described.

In order to permit the forcing of the material in the container from out of the spouts when desired a piston or follower 36 is slidably and snugly fitted within the cylindrical body 12 and this piston or follower supports an axially disposed feed screw or plunger rod 37. As shown, the feed screw or rod 37 is threaded throughout its entire length and is provided with a longitudinally extending channel 38. The channel 38 receives a key 39 carried by the upper bar 21 of the arch and this key prevents turning movement of the said feed screw or plunger rod.

In order to bring about the raising and lowering of the plunger rod a feed nut 40 is threaded on the said rod and disposed between the bearing sleeves 24 formed on the arch. This feed nut 40 is provided with a beveled gear 41 which has meshing therewith a drive pinion 42. This drive pinion is keyed or otherwise secured to a drive shaft 43 which is rotatably mounted in the bearing sleeve 35 formed on the side bar 24' of the arch. This shaft 43 can be rotated in any desired way, and as shown I have provided a hand crank 44 therefore.

It is obvious that upon rotation of the hand crank 44 the piston or follower 36 will be raised or lowered according to the direction in which the said crank is turned.

The upper end of the arch supports a U-shaped scale plate 45 which includes parallel arms 46 and 47 and a connecting head 48. The arms 46 and 47 are suitably graduated and have cooperating therewith an indicator 49 which is secured to the feed screw.

When the desired amount of material has been dispensed from the spout, the material is adapted to be cut off from the main portion thereof close to the lower edge of the spout and I provide a novel cutter or snipper 50 for this purpose. This cutter or snipper 50 comprises a block 51 which is disposed between and in rear of the dispensing spouts 13 and 14. This block is rotatably mounted upon a depending shaft or supporting rod 52 which is secured in any desired way to the bottom wall of the container. The lower end of the block 51 is provided with a horizontally disposed cutting wire 53 which is arranged in the same horizontal plane as the lower edges of the spouts 13 and 14. This cutting wire 53 is of a substantially U-shape and is preferably made in a single strand of wire and as shown the same is extended through the block 51 in order to provide a manipulating handle 54. It can be seen that after the desired amount of material has been forced from either one of the spouts that it is merely necessary to grasp the handle 54 and swing the cutting wire 53 across the spout which will of course sever the material dispensed from the body of the material in the container or spout.

In use of the improved dispensing machine, the latch 34 is swung from out of engagement with the lower end of the bar 24' and the arch and cover 25 are swung to one side of the container and the container is then initially filled with the material to be dispensed. After the material has been placed in the container the arch with the cover is swung back to its normal position and held in place by the latch 34.

When a customer desires a certain quantity of the material in the container it is merely necessary to remove one of the caps 15 from the spout 13 or 14 according to the amount desired and turn the crank 44 so as to feed the plunger or follower 36 downward, and when the desired amount has been dispensed, which can be seen by referring to the indicator 49, the cutter or snipper 51 is manipulated as hereinbefore described. The cap 15 can then be placed back on the spout so as to protect the contents of the container from foreign matter.

While in Figures 1 to 9, inclusive, I have shown the preferred means of disposing the arch or head 20 on the container 10, it is to be understood that other means can be utilized for hingedly securing the said arch or head in place, and in Figures 11 to 13, inclusive, I have shown another means for accomplishing this. In this form the arch 20 at one side thereof is provided with a depending lug 60 which is fitted between laterally extending ears 61 formed on the container. A suitable pivot pin or the like 62 is utilized for hingedly connecting the lug in place. The other side of the head or arch 20 is provided with a laterally extending lug 63 which is adapted to engage a companion lug 64 formed on the upper end of the container when the head is in its operative position. These lugs 63 and 64 are provided with mating screw threaded openings for the reception of a holding thumb screw 65. In this construction when it is desired to swing the head or arch out of position to permit the filling of the container, the plunger 36 is moved to the extreme upper end of the container and the screw 65 is manipulated so as to move the same out of engagement with the lug 64, after which the head or arch is swung on the pivot pin 62.

In Figures 15 to 20 inclusive I have shown a modified form of spout and cutoff which can be used in lieu of the threaded caps 15 and the cutter or snipper 50.

As shown in Figure 15 the dispensing machine is provided with one or more delivery spouts which can be of a polygonal shape in cross section and the lower end of the spout is provided with a marginal attaching flange 71. This marginal attaching flange 71 has bolted or otherwise secured thereto as at 72 a supporting box or frame 73 which slidably receives the cutoff block and cutter 74. As clearly shown in Figure 19 of the drawing the frame or box 73 has its upper and lower walls provided with aligned openings 75 which register with the lower end of the spout 70 whereby the material can be readily forced through the box into the containers provided for receiving the material.

The combined cut off block and cutter 74 is of a wedge shape as clearly shown in Figure 20 and has its inner active edge provided with a cutting face 76 so that when the block is slid into the frame or box 73 across the opening 75 therein that the material will be efficiently severed from the body of the material contained in the spout. The outer end of this block is provided with a suitable manipulating handle 77.

I prefer to make the block of a wedge shape, so that as the same is moved into the frame or box it will become tightly wedged in position thereby forming an effective closure for the spout, which will prevent the entrance of dirt, dust and the like into the body of the container. The binding of the cutoff block in position eliminates the necessity of providing extraneous fasteners and the like.

In order to limit the sliding movement of the cutoff block into and out of the frame or box 73 and to guide the same in its sliding movement the block is provided with a longitudinally extending centrally disposed guide slot 78 which receives a guide bolt 79 carried by the box.

In use of this form of cutoff, the block 74 is pulled out to its full extent until the desired amount of material is forced through the spout; after which the block 74 is again forced in place and the sharp edge 76 thereof will sever the material and then form a tight closure for the spout.

From the foregoing description, it can be seen that I have provided an exceptionally simple and durable device for dispensing foodstuff in a convenient and expeditious manner.

Changes in details may be made without departing from the scope or the spirit of this invention, but:—

What I claim as new is:—

1. A machine for dispensing lard and other semi-solid substances comprising a cylindrical container, a pair of laterally and depending extending outlet spouts of different sizes associated with the lower end of the container, removable closure caps for the free ends of the spouts, a piston slidably mounted within the container, a swinging head carried by the upper end of the container including a closure plate for the container, said head being adapted to swing toward and away from the container, a feed nut carried by the head, a threaded piston rod slidably associated with the head threadedly receiving the feed nut, a scale plate carried by the head, and an indicator associated with the feed screw for movement over the dial plate, and means carried by the head for rotating said feed nut.

2. A machine for dispensing lard and other semi-solid substances comprising a cylindrical container, a depending delivery spout carried by the lower end of the container and communicating therewith, a head block arranged to normally extend diametrically across the upper open end of the container, said head block including upper and lower parallel bars and connecting side bars, means connecting one of the side bars to one side of the container for swinging movement, means for engaging the other side bar for normally holding the same against swinging movement relative to the container, a piston slidably mounted in the container, a feed screw carried by the piston and extending through the upper and lower bars of the head for sliding movement, means carried by one of the upper and lower bars for engaging the screw to prevent rotary movement thereof, a feed nut threaded on the screw and disposed between and engaging the top and bottom bars of the head formed on the feed screw, a gear on said feed nut, means for operating the gear, a dial plate carried by the upper end of the head, and an indicator carried by the screw for movement over said plate.

3. A machine for dispensing lard and other semi-solid foodstuff comprising a container, a pair of depending delivery spouts carried by the lower end of the container, means for forcing the material in the container through the spouts, closure members for the lower ends of the spouts, and a cutter for severing the material dispensed through the spouts therefrom including a depending pivot bolt carried by the lower end of the container, a block rotatably mounted upon the bolt, a substantially U-shaped severing wire carried by the block disposed in the same horizontal plane with the lower ends of the spouts and arranged to swing across said spouts, the wire being extended entirely through the block to form an operating handle.

4. A dispensing apparatus comprising a container, a plurality of spouts extending therefrom of different capacities, individual caps closing each spout, power means for forcing material from the container through that spout having its cap removed, and a cutter mounted on the container and positioned to swing into operative relation with any one of said spouts.

5. A dispensing apparatus comprising a container, a spout extending therefrom, power means for the container including a head swingingly mounted on the container, semicircular plates secured to the head for closing the top of the container, gear mechanism carried by the head, and a scale rigidly connected to the head to extend in a position to coact with a portion of said gear mechanism to give an indication.

6. A dispensing apparatus comprising a container, a spout leading therefrom, a head carrying plates for closing the top of the container, rods establishing a connection between the intermediate portion of the container and the head of a construction to allow said head to swing in horizontal planes, a piston operating within the container, actuating mechanism therefor carried by the head and including a worm shaft, a scale disposed adjacent to the worm shaft and rigidly connected to the head, and an indicator fixed to the worm shaft for movement over said scale.

In testimony whereof I affix my signature.

LEWIS H. CHESSON.